(12) United States Patent
Meng

(10) Patent No.: US 10,193,818 B2
(45) Date of Patent: Jan. 29, 2019

(54) METHOD AND APPARATUS FOR ALLOCATING BANDWIDTHS, AND COMPUTER STORAGE MEDIUM

(71) Applicant: XI'AN ZHONGXING NEW SOFTWARE CO. LTD., Shaanxi (CN)

(72) Inventor: Yichao Meng, Shaanxi (CN)

(73) Assignee: XI'AN ZHONGXING NEW SOFTWARE CO. LTD., Shaanxi (CN)

( * ) Notice: Subject to any disclaimer, the term of this patent is extended or adjusted under 35 U.S.C. 154(b) by 67 days.

(21) Appl. No.: 15/320,182

(22) PCT Filed: Nov. 10, 2014

(86) PCT No.: PCT/CN2014/090693
§ 371 (c)(1),
(2) Date: Dec. 19, 2016

(87) PCT Pub. No.: WO2015/192587
PCT Pub. Date: Dec. 23, 2015

(65) Prior Publication Data
US 2017/0126579 A1 May 4, 2017

(30) Foreign Application Priority Data

Jun. 19, 2014 (CN) .......................... 2014 1 0276025

(51) Int. Cl.
*H04L 12/911* (2013.01)
*H04L 12/851* (2013.01)
(Continued)

(52) U.S. Cl.
CPC .......... *H04L 47/70* (2013.01); *H04L 41/0896* (2013.01); *H04L 41/20* (2013.01);
(Continued)

(58) Field of Classification Search
CPC ......... H04L 47/70; H04L 67/22; H04L 41/20; H04L 41/0896; H04L 45/54;
(Continued)

(56) References Cited

U.S. PATENT DOCUMENTS

| 7,912,001 B2* | 3/2011 | Wright | H04L 47/32 345/619 |
|---|---|---|---|
| 2007/0224977 A1* | 9/2007 | Yamaguchi | G01S 5/0009 455/414.2 |
| 2009/0180430 A1* | 7/2009 | Fadell | H04L 12/5695 370/329 |
| 2009/0323516 A1* | 12/2009 | Bhagwan | H04L 41/0636 370/216 |
| 2011/0035395 A1* | 2/2011 | Sazuka | G06F 17/30528 707/758 |
| 2011/0134755 A1* | 6/2011 | Wright | H04L 41/5025 370/235 |
| 2012/0036513 A1* | 2/2012 | Choong | H04L 41/0896 718/104 |

(Continued)

FOREIGN PATENT DOCUMENTS

| CN | 101155093 A | 4/2008 |
|---|---|---|
| CN | 102238631 A | 11/2011 |

(Continued)

OTHER PUBLICATIONS

International Search Report for Application No. PCT/CN2014/090693, dated Mar. 16, 2015.

*Primary Examiner* — Faisal Choudhury
(74) *Attorney, Agent, or Firm* — Marshall, Gerstein & Borun LLP

(57) ABSTRACT

A method for allocating bandwidths is provided. The method may include: establishing a database storing use records of application services, compiling statistics on attributes and use frequencies of the application services according to the use records, by a network access device; extracting features
(Continued)

from the application services; classifying the application services according to the attributes, the use frequencies and the features of the application services, and allocating bandwidths to each of the application services based on the classified classes. An apparatus for allocating bandwidths and a computer storage medium are further provided.

15 Claims, 3 Drawing Sheets

(51) Int. Cl.
  *H04L 12/741* (2013.01)
  *H04L 29/08* (2006.01)
  *H04L 12/24* (2006.01)
  *H04L 12/927* (2013.01)
  *H04L 12/28* (2006.01)
(52) U.S. Cl.
  CPC .......... *H04L 45/54* (2013.01); *H04L 47/2441* (2013.01); *H04L 47/781* (2013.01); *H04L 47/788* (2013.01); *H04L 47/803* (2013.01); *H04L 67/22* (2013.01); *H04L 47/821* (2013.01)

(58) Field of Classification Search
  CPC . H04L 47/2441; H04L 47/788; H04L 47/803; H04L 47/781; H04L 47/821
  USPC ......................................................... 370/392
  See application file for complete search history.

(56) References Cited

U.S. PATENT DOCUMENTS

| | | | |
|---|---|---|---|
| 2012/0258696 A1* | 10/2012 | Nam | ....................... H04W 4/02 455/414.2 |
| 2014/0226571 A1* | 8/2014 | Das | ..................... H04L 41/0896 370/329 |
| 2014/0241299 A1 | 8/2014 | Zhao | |
| 2015/0215804 A1* | 7/2015 | Ideses | ................... H04W 28/02 370/230 |

FOREIGN PATENT DOCUMENTS

| | | |
|---|---|---|
| CN | 103024825 A | 4/2013 |
| WO | WO-2013/116852 A1 | 8/2013 |

* cited by examiner

METHOD AND APPARATUS FOR ALLOCATING BANDWIDTHS, AND COMPUTER STORAGE MEDIUM

TECHNICAL FIELD

The present disclosure relates to the field of network bandwidth, and particularly relates to a method and apparatus for allocating bandwidths based on application services of a user, and a computer storage medium.

BACKGROUND

With rapid popularization and development of network bandwidth services, a convenient and intelligent network access device has become an inevitable trend. For instance, portable routing devices such as a user-friendly interface (UFI), a customer premise equipment (CPE) are very popular, and become necessities of every family or office gradually. However, due to a wide variety of these routing devices and different factors such as user's age, education, technical level and the like, the operation setting of such kind of network access device has become a primary problem of a user. Although most devices have detailed manuals, many users can not complete the operation settings because that the process is complex and there are many technical terms.

In addition, the user also pays great attention to the allocation of network bandwidth. There are many methods for allocating bandwidths. Now, the user usually adopts a fixed bandwidth service, that is, a specified bandwidth corresponding to a bandwidth of an input end of a WAN (Wide Area Network) side of the routing device is allocated to the user by an operator according to the bandwidth selected by the user and the payment amount. Individual online preferences are different, and demands for various network application services are also different. For instance, some people love watching video programs such as movies and television program, then a relatively large network bandwidth is needed, while some people like to browse webpages, and read news, novels and the like, then a relatively small bandwidth is needed by such service. However, according to the existing fixed bandwidth, the bandwidth adopted when browsing webpages and the bandwidth adopted when watching videos are the same, causing a waste of a lot of network resources to a great extent.

SUMMARY

In order to solve existing problems, embodiments of the present invention desire to provide a method and apparatus for allocating bandwidths, and a computer storage medium.

A technical solution of the embodiments of the present invention is achieved as follows.

An embodiment of the present invention provides a method for allocating bandwidths, including:

establishing a database storing use records of application services, and compiling statistics on attributes and use frequencies of the application services according to the use records, by a network access device; extracting features from the application services; classifying the application services according to the attributes, the use frequencies and the features of the application services, and allocating bandwidths to each of the application services based on the classified classes.

An embodiment of the present invention provides an apparatus for allocating bandwidths, comprising a processor and a storage device for storing computer executable instructions that when executed by the processor cause the processor to perform the steps in following modules:

a statistics module, configured to establish a database storing use records of application services, and compile statistics on attributes and use frequencies of the application services according to the use records;

an identification module, configured to extract features from the application services; and a bandwidth allocation module, configured to classify the application services according to the attributes, the use frequencies and the features of the application services, and allocate bandwidths to each of the application services based on the classified classes.

An embodiment of the present invention further provides a computer storage medium storing a computer program for executing the above-described method for allocating bandwidths.

According to a method and apparatus for allocating bandwidths, and a computer storage medium provided by the embodiments of the present invention, a network access device establishes a database, compiles statistics on attributes and use frequencies of application services, extracts features from the application services; and classifies the application services according to the attributes, the use frequencies and the features of the application services, and allocates bandwidths to the application services based on the classified classes. As such, the network access device may allocate bandwidths according to the frequencies of using the application services by the user, so that the bandwidths are more conveniently and intelligently allocated. Moreover, network resources are fully utilized, and the Internet-enabling fluency of various application services used by the user is greatly improved, thus the Internet-enabling demands of individuals in families or small units can be met, while the operational complexity of the device and the user participation are reduced.

DETAILED DESCRIPTION

In embodiments of the present invention, a network access device is configured to establish a database, compile statistics on attributes and use frequencies of application services; extract features from the application services; classify the application services according to the attributes, the use frequencies and the features of the application services, and allocate bandwidths to the application services based on the classified classes.

The present disclosure will be described below in details with reference to accompanying drawings and particular embodiments.

Figure 1:
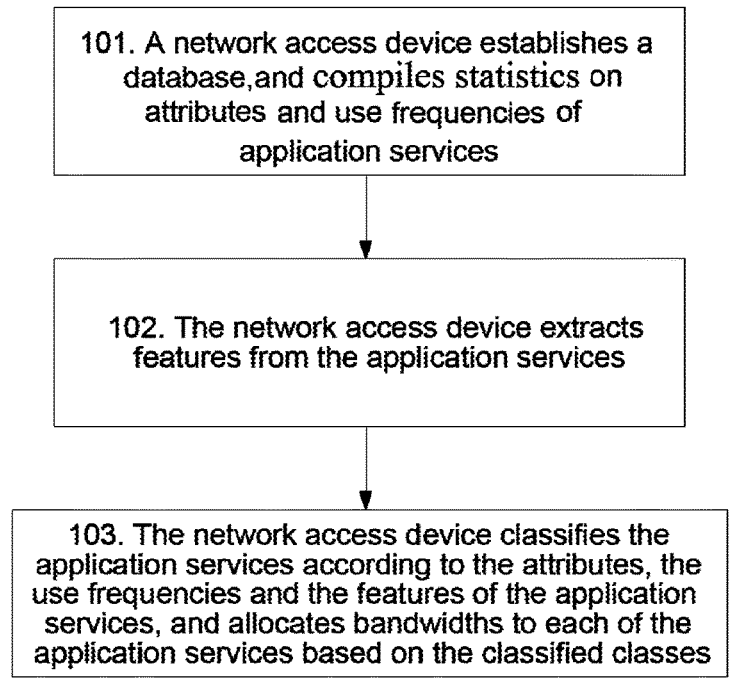
FIG. 1 is a schematic diagram showing a flow of a method for allocating bandwidths based on application services of a user provided by an embodiment of the present invention.

The flow of a method for allocating bandwidths based on application services of a user provided by the present disclosure is shown in FIG. 1. The method includes the steps described below.

In Step 101, a network access device establishes a database, and compiles statistics on attributes and use frequencies of application services.

Optionally, the network access device establishes a database, and determines a period which may be any period and is generally determined as a month; stores a use record of using application services by a user in the database, and compiles statistics on the attributes and the use frequencies of using the application services by the user within the period according to the use record; and sorts the application services in accordance with the use frequencies, and outputs a use frequency-based sorted table.

The use frequency may be $$\frac{[(T2-T1) \times C]}{T},$$

where T2 represents the time when an application service is terminated to be used, T1 represents the time when the application service is started to be used, C represents the times that the application service has been used within the period, and T represents a total time of the period.

Figure 2:
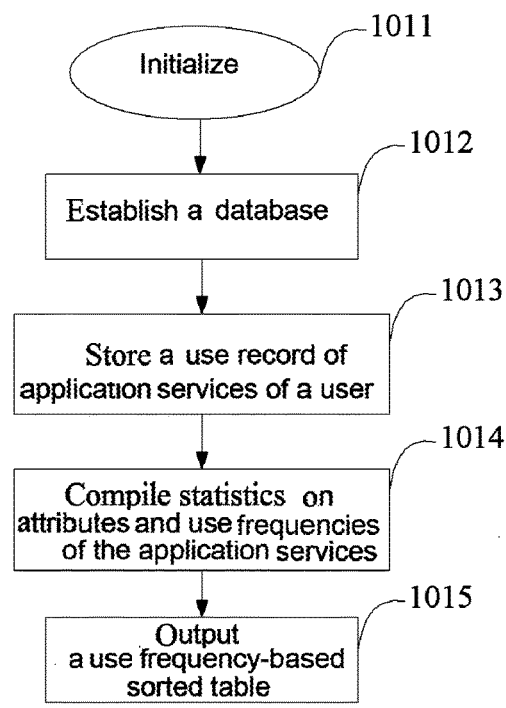
FIG. 2 is a schematic diagram showing a specific flow of step 101 provided by an embodiment of the present invention.

FIG. 2 is an optional execution flow of Step 101.

In Step 1011, the network access device is initialized.

In Step 1012, a database used to store the use record of the user is established.

In Step 1013, application services used by the user are detected by an application service detector in the device, and the use record of the application services of the user is stored in the above-described database.

In Step 1014, statistics of attributes and use frequencies of all used application services is compiled according to the use record in the database.

In Step 1015, based on a statistics result, a use frequency-based sorted table is generated in accordance with the use frequencies and the attributes of the application services.

In Step 102, the network access device extracts features from the application services.

A deep analysis software for protocols may be installed on the network access device, and may be utilized to extract features from the application services used by the user, so as to generate a feature vector, where the feature vector is used to uniquely identify a certain application service and may be represented as $\{1, \delta_2, \delta_3, \delta_4, \ldots\}$, and dimensions of the feature vector may be uncertain, and may be different according to different application services.

Figure 3:
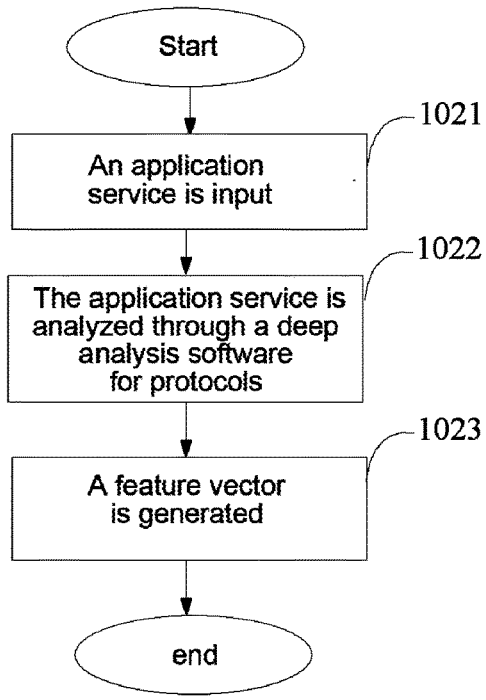
FIG. 3 is a schematic diagram showing a specific flow of step 102 provided by an embodiment of the present invention.

A particular execution flow may be represented by a flow diagram as shown in FIG. 3.

In Step 1021, the Step 102 is started, the application services used by the user are input into the deep analysis software for protocols one by one, and herein one application service is input.

In Step 1022, the input application service is analyzed by the deep analysis software for protocols so as to extract the features.

In Step 1023, the feature vector is generated according to the extracted features.

The method may further include: an Internet Protocol (IP) information packet filtering system (IPTABLES) table rule is added in accordance with the feature vectors, and data packets of the application services are classified and marked.

Optionally, as described above, the feature vector is used to distinguish the classes of the application services, and the IPTABLES table rule is used to mark different classes of application services, and one table of the IPTABLES table rule is used to mark the data packets of the application services, for instance, the data packets may be marked by using a mangle table.

In Step 103, the application services are classified by the network access device according to the attributes, the use frequencies and the features of the application services, and bandwidths are allocated to the application services based on the classified classes.

Firstly, a set of traffic control (TC) rules may be determined, according to the attributes and the use frequencies of the application services, by using a queueing discipline. In an existing network access device, a system generally used is a Linux system, therefore, the above-described queueing discipline is particularly a hierarchical token bucket (HTB) and class based queueing (CBQ) queueing discipline in the Linux system. The queueing discipline may be used to illustrate a data packet arrangement format in the system. The set of TC rules may be determined, according to the attributes and the use frequencies of the application services, by using a queueing discipline specified by the system, and then traffic bandwidths may be controlled by the system in accordance with the set of TC rules. The set of TC rules may be used to allocate bandwidths according to the use frequencies of the application services, the larger the use frequencies are, the more allocated bandwidths are, and the set of TC rules is a system kernel command.

Secondly, the application services may be classified according to the features of the application services, and a class priority may be set according to the use frequencies. The application services in a network have many classes which may be approximately classified into videos, audios, games and the like, and are classified according to the extracted features of the application services, for instance, applications such as Youku, iQIYI are classified in a video class, applications such as Koowo Music and KuGoo are classified in an audio class, and the like. The setting of a priority may be used to determine which data packet is passed when data packets of different application services are simultaneously reached.

Subsequently, bandwidths may be allocated to various classes of application services in accordance with the set of TC rules and the class priority. For example, since the favorite of a user is a video interface, a maximum bandwidth is allocated to the application service of the video class in accordance with the set of TC rules.

The data packets of the incoming application services may be distributed in accordance with marks of the data packets in the IPTABLES table rule, so that the data packets of each application service obtain corresponding bandwidths.

Optionally, if the user is using an application service, there is a mark of this application service in the IPTABLES table rule, and when data packets of this application service arrive at the network access device, the data packets are distributed by the network access device in accordance the marks thereof, so as to obtain a corresponding bandwidth. For example, services of video class and game class are currently used, the network access device particularly identifies which service is a service of video class or a service of game class according to the mark, and distributes the data packets in accordance with the class, that is, the video data packets and the game data packets are separated, so that the video data packets and the game data packets can obtain corresponding bandwidth allocated according to the TC rules.

Figure 4:
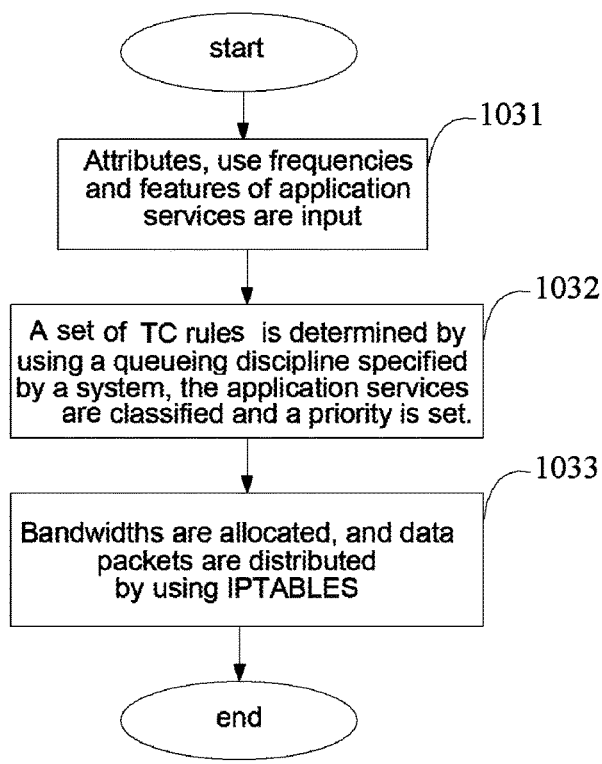
FIG. 4 is a schematic diagram showing a specific flow of step 103 provided by an embodiment of the present invention.

FIG. 4 shows an optional execution flow of Step 103.

In step 1031, the attributes, use frequencies and features of application services, which are obtained in the previous two steps, are collected together by the network access device.

In step 1032, based on the attributes, the use frequencies and the features of the application services, a set of TC rules is determined in accordance with a queueing discipline specified by a system, so as to classify the application services and determine a priority.

In step 1033, bandwidths are allocated to each application service based on the classified classes and the priority, and the device also needs to distribute the data packets according to the marks in the IPTABLES, so that the data packets of various classes of application services may get correspondingly allocated bandwidths.

Figure 5:
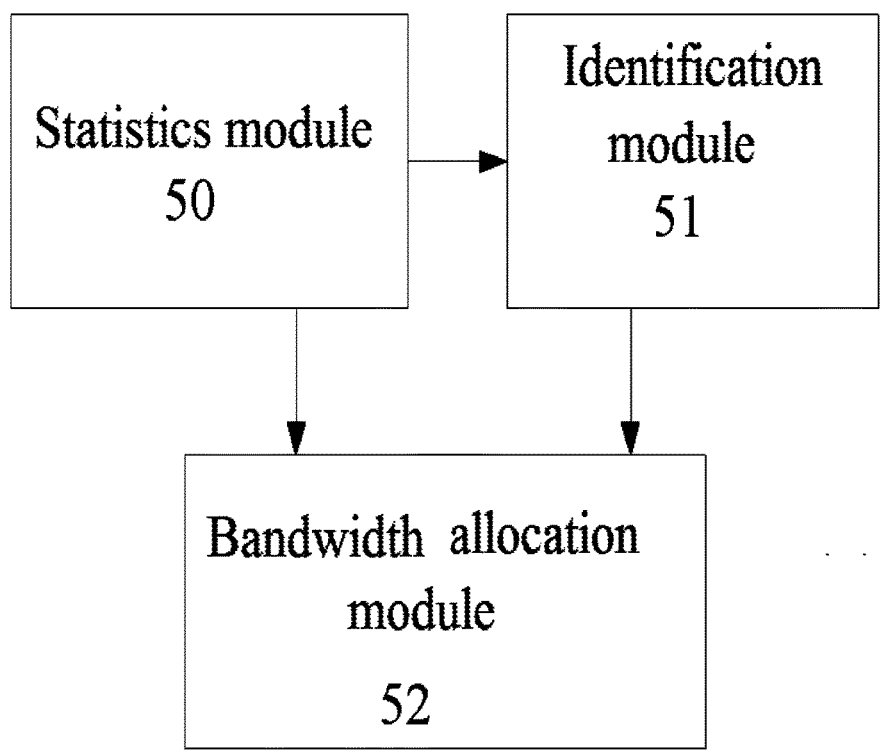
FIG. 5 is a schematic diagram showing a structure of an apparatus for allocating bandwidths based on application services of a user provided by an embodiment of the present invention.

FIG. 5 shows a structure of an apparatus for allocating bandwidths based on application services of a user provided by embodiments of the present invention. As shown in FIG. 5, the apparatus includes a statistics module 50, an identification module 51 and a bandwidth allocation module 52.

The statistics module 50 is configured to establish a database, and compile statistics on attributes and use frequencies of application services.

The identification module 51 is configured to extract features from the application services.

The bandwidth allocation module 52 is configured to classify the application services according to the attributes, the use frequencies and the features of the application services, and allocate bandwidths to each application service based on the classified classes.

The statistics module 50 may be configured to establish a database, and determine a period which may be any period and is generally determined as one month; store a use record of application services used by a user in the database, compile statistics on the attributes and the use frequencies of the application services used by the user within the period according to the use record; and sort the application services in accordance with the use frequencies, and output a use frequency-based sorted table.

The use frequency may be $$\frac{[(T2-T1) \times C]}{T},$$

where T2 represents the time when an application service is terminated to be used, T1 represents the time when the application service is started to be used, C represents times that the application service has been used within the period of time, and T represents a total time of the period.

The identification module 51 may be configured to call a deep-analysis software for protocols to extract features from the application services used by the user, so as to generate a feature vector, where the deep-analysis software for protocols is an assistant software installed on the device; the feature vector is used to uniquely identify a certain application service and may be represented as {1, δ$_2$, δ$_3$, δ$_4$, . . . }, and dimensions of the feature vector are uncertain, and are different according to different application services.

The identification module 51 may be further configured to add an IPTABLES table rule in accordance with the feature vector, and classify and mark data packets of each application service.

As described above, the feature vector may be used to distinguish the classes of the application services, and the IPTABLES table rule may be used to mark different classes of application services, and tables of the IPTABLES table rule may be used to mark the data packets of each application service, for instance, the data packets may be marked by a mangle table.

The bandwidth allocation module 52 may be configured to determine, based on the attributes and the use frequencies of the application services, a set of TC rules by using a queueing discipline specified by the system; classify the application services according to the features of the application services, and set a class priority according to the use frequencies; allocate bandwidths to various application services based on classes in accordance with the set of TC rules and the class priority.

The queueing discipline in the system may be used when the set of TC rules is determined, so that the system can identify the set of TC rules. Currently, generally used is a Linux system, where the queueing discipline is HTB, CBQ.

The set of TC rules may be used to allocate bandwidths according to the use frequencies of the application services, the larger the use frequencies are, the more the allocated bandwidths are.

The statistics module 50 may be implemented jointly by a chip for detecting user application services and a memory chip in a network access device. The identification module 51 may be implemented by calling associated software via a master chip. The bandwidth allocation module 52 may be implemented by a main processing chip and its peripheral auxiliary elements or chips.

The method of allocating bandwidths based on application services of a user described in the embodiments of the present invention may be stored in a computer-readable storage medium when being implemented in a form of a software functional module and being sell or used as a stand-alone product. Based on such an understanding, those skilled in the art will appreciate that embodiments of this application may be provided as a method, system, or computer program product. Thus, this application may take a form of a complete hardware embodiment, a complete software embodiment, or an embodiment incorporated with software aspect and hardware aspect. Moreover, this application may take a form of a computer program product implemented on one or more computer usable storage media having computer-usable program code embodied therein, and the storage media include but not limited to, a USB disk, a removable hard disk, a read only memory (ROM), a magnetic disk storage, a compact disc read-only memory (CD-ROM), an optical memory, and the like.

The above description is only illustrative of embodiments of the present invention and is not intended to limit a protective scope of the present invention. Any modifications, equivalent substitutions and improvements made within the spirit and principles of the present disclosure are intended to be encompassed within the protective scope of the present disclosure.

INDUSTRIAL APPLICABILITY

In embodiments of the present invention, a network access device establishes a database, compiles statistics on attributes and use frequencies of application services, classifies the application services according to the attributes, the use frequencies and the features of the application services, and allocates bandwidths to each application service based on the classified classes. As such, bandwidths may be intelligently allocated according to use habits and hobbies of a user, so that network resources are fully utilized, which is a great improvement in the quality of network services.

What is claimed is:

1. A method for allocating bandwidths, comprising:
establishing a database storing use records of application services used by a user, compiling statistics on attributes and use frequencies of the application services according to the use records, by a network access device;
extracting features from the application services so as to generate, for each of the application services, a feature vector that uniquely identifies the each of the application services;
classifying the application services according to the attributes, the use frequencies and the features of the application services, and allocating bandwidths to each of the application services based on the classified classes,
wherein compiling statistics on attributes and use frequencies of the application services comprises:
determining a period;
compiling statistics on attributes and use frequencies of the application services used by the user within the period;
sorting each of the application services in accordance with the use frequencies, and
outputting a use frequency-based sorted table;
wherein the use frequency is $$\frac{[(T2-T1) \times C]}{T},$$

wherein T2 represents a time when one of the application services is terminated to be used, T1 represents a time when the application service is started to be used, C represents times that the application service has been used within the period, and T represents a total time of the period.

2. The method according to claim 1, wherein
the extracting features from the application services comprises: using a deep analysis software for protocols to extract features from each of the application services used by the user, so as to generate the feature vector;
the method further comprises: adding an Internet Protocol (IP) information packet filtering system (IPTABLES) table rule in accordance with the feature vector, and marking data packets of each of the application services by class.

3. The method according to claim 2, wherein
the classifying the application services according to the attributes, the use frequencies and the features of the application services, and allocating bandwidths to each of the application services based on the classified classes comprises: determining, according to the attributes and the use frequencies of the application services, a set of traffic control (TC) rules by using a queueing discipline of a system; classifying the application services according to the features of the application services, and setting a class priority according to the use frequency-based sorted table; allocating bandwidths to various classes of application services in accordance with the set of TC rules and the class priority; and distributing data packets of incoming application services in accordance with marks for the data packets in the IPTABLES table rule, so that the data packets of each of the application services obtain corresponding bandwidths.

4. The method according to claim 3, wherein
the set of TC rules is a set of rules of allocating bandwidths according to the use frequencies of the application services.

5. The method according to claim 3, wherein when data packets of different application services are simultaneously received by the network access device, the class priority is used to determine a transmission priority of each of the data packets.

6. A non-transitory computer storage medium storing a computer program which, when executed by a processor, cause the processor to perform a method for allocating bandwidths comprising:
establishing a database storing use records of application services used by a user, compiling statistics on attributes and use frequencies of the application services, by a network access device;
extracting features from the application services so as to generate, for each of the application services, a feature vector that uniquely identifies the each of the application services; and
classifying the application services according to the attributes, the use frequencies and the features of the application services, and allocating bandwidths to each of the application services based on the classified classes,
wherein compiling statistics on attributes and use frequencies of the application services comprises:
determining a period;
compiling statistics on attributes and use frequencies of the application services used by the user within the period;
sorting each of the application services in accordance with the use frequencies, and
outputting a use frequency-based sorted table;
wherein the use frequency is $$\frac{[(T2-T1) \times C]}{T},$$

wherein T2 represents a time when one of the application services is terminated to be used, T1 represents a time when the application service is started to be used, C represents times that the application service has been used within the period, and T represents a total time of the period.

7. The non-transitory computer storage medium according to claim 6, wherein
the extracting features from the application services comprises: using a deep analysis software for protocols to extract features from each of the application services used by the user, so as to generate the feature vector;
the method further comprises: adding an Internet Protocol (IP) information packet filtering system (IPTABLES) table rule in accordance with the feature vector, and marking data packets of each of the application services by class.

8. The non-transitory computer storage medium according to claim 7, wherein
the classifying the application services according to the attributes, the use frequencies and the features of the application services, and allocating bandwidths to each of the application services based on the classified classes comprises: determining, according to the attributes and the use frequencies of the application services, a set of traffic control (TC) rules by using a queueing discipline of a system; classifying the application services according to the features of the application services, and setting a class priority according to the use frequency-based sorted table; allocating bandwidths to various classes of application services in accordance with the set of TC rules and the class priority; and distributing data packets of incoming application services in accordance with marks for the data packets in the IPTABLES table rule, so that the data packets of each of the application services obtain corresponding bandwidths.

9. The non-transitory computer storage medium according to claim 8, wherein the set of TC rules is a set of rules of allocating bandwidths according to the use frequencies of the application services.

10. The non-transitory computer storage medium according to claim 8, wherein when data packets of different application services are simultaneously received, the class priority is used to determine a transmission priority of each of the data packets.

11. An electronic device, comprising:
at least one processor;
a memory communicably connected to the at least one processor and for storing instructions executable by the at least one processor,
wherein execution of the instructions by the at least one processor causes the at least one processor to:
establish a database storing use records of application services used by a user, compile statistics on attributes and use frequencies of the application services according to the use records;
extract features from the application services so as to generate, for each of the application services, a feature vector that uniquely identifies the each of the application services;
classify the application services according to the attributes, the use frequencies and the features of the application services, and allocate bandwidths to each of the application services based on the classified classes,
wherein when the at least one processor is caused to compile statistics on attributes and use frequencies of the application services, the execution of the instructions by the at least one processor causes the at least one processor to:
determine a period;
compile statistics on attributes and use frequencies of the application services used by the user within the period;
sort each of the application services in accordance with the use frequencies, and
output a use frequency-based sorted table;
wherein the use frequency is $$\frac{[(T2-T1) \times C]}{T},$$

wherein T2 represents a time when one of the application services is terminated to be used, T1 represents a time when the application service is started to be used, C represents times that the application service has been used within the period, and T represents a total time of the period.

12. The electronic device according to claim 11, wherein when the at least one processor is caused to extract features from the application services, the execution of the instructions by the at least one processor causes the at least one processor to: use a deep analysis software for protocols to extract features from each of the application services used by the user, so as to generate the feature vector;
wherein the execution of the instructions by the at least one processor further causes the at least one processor to: add an Internet Protocol (IP) information packet filtering system (IPTABLES) table rule in accordance with the feature vector, and mark data packets of each of the application services by class.

13. The electronic device according to claim 12, wherein when the at least one processor is caused to classify the application services according to the attributes, the use frequencies and the features of the application services, and allocate bandwidths to each of the application services based on the classified classes, the execution of the instructions by the at least one processor causes the at least one processor to:
determine, according to the attributes and the use frequencies of the application services, a set of traffic control (TC) rules by using a queueing discipline of a system;
classify the application services according to the features of the application services, and set a class priority according to the use frequency-based sorted table;
allocate bandwidths to various classes of application services in accordance with the set of TC rules and the class priority; and
distribute data packets of incoming application services in accordance with marks for the data packets in the IPTABLES table rule, so that the data packets of each of the application services obtain corresponding bandwidths.

14. The electronic device according to claim 13, wherein the set of TC rules is a set of rules of allocating bandwidths according to the use frequencies of the application services.

15. The electronic device according to claim 13, wherein when data packets of different application services are simultaneously received, the class priority is used to determine a transmission priority of each of the data packets.

* * * * *